(12) United States Patent
Kußmaul et al.

(10) Patent No.: US 11,630,755 B2
(45) Date of Patent: Apr. 18, 2023

(54) REQUEST FLOW LOG RETRIEVAL

(71) Applicant: INTERNATIONAL BUSINESS MACHINES CORPORATION, Armonk, NY (US)

(72) Inventors: Timo Kußmaul, Boeblingen (DE); Uwe K. Hansmann, Tuebingen (DE); Klaus Rindtorff, Weil im Schoenbuch (DE); Daniel Blum, Stuttgart (DE); Thomas Steinheber, Maihingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1055 days.

(21) Appl. No.: 16/370,713

(22) Filed: Mar. 29, 2019

(65) Prior Publication Data

US 2020/0310939 A1    Oct. 1, 2020

(51) Int. Cl.
*G06K 9/62* (2022.01)
*G06N 20/00* (2019.01)
*G06F 17/15* (2006.01)
*G06N 5/02* (2006.01)
*G06F 11/34* (2006.01)
*G06N 5/00* (2006.01)

(52) U.S. Cl.
CPC .......... *G06F 11/3476* (2013.01); *G06F 17/15* (2013.01); *G06K 9/6257* (2013.01); *G06K 9/6267* (2013.01); *G06N 5/00* (2013.01); *G06N 5/022* (2013.01); *G06N 20/00* (2019.01)

(58) Field of Classification Search
CPC ........ G06N 20/00; G06N 5/022; G06F 17/15; G06K 9/6257; G06K 9/6267
See application file for complete search history.

(56) References Cited

U.S. PATENT DOCUMENTS

| | | | |
|---|---|---|---|
| 7,395,256 B2 | 7/2008 | Ji et al. |
| 7,895,167 B2 | 2/2011 | Berg et al. |
| 7,904,929 B1 | 3/2011 | Jaunin et al. |
| 10,019,510 B2 | 7/2018 | Gukal |
| 2010/0306315 A1 | 12/2010 | Smith et al. |

(Continued)

OTHER PUBLICATIONS

Carstens, J., "Search Engine Based Prioritized Software Logging," Siemens AG © 2006. IP.com Prior Art Database Technical Disclosure, No. IPCOM000143689D, Jan. 10, 2007, 5 pg.

(Continued)

*Primary Examiner* — Markus A. Vasquez
(74) *Attorney, Agent, or Firm* — Cuenot, Forsythe & Kim, LLC

(57) ABSTRACT

Request flow log retrieval can include extracting one or more keywords from a natural language description of an action, the action being a system response to a user request submitted to a resource-provisioning system during a user session. Request flow log retrieval can also include determining a classification of the action based on a correlation value generated by a classifier model trained using machine learning to classify actions performed by the resource-provisioning system, the classification based on the one or more keywords. Additionally, request flow log retrieval can include automatically identifying a request flow associated with the action based on the classification of the action and returning at least one system log entry corresponding to the request flow.

14 Claims, 10 Drawing Sheets

(56) References Cited

U.S. PATENT DOCUMENTS

| | | | | |
|---|---|---|---|---|
| 2015/0317355 | A1* | 11/2015 | Schimmelpfeng | G06F 16/951 |
| | | | | 707/722 |
| 2016/0224401 | A1* | 8/2016 | Adinarayan | G06F 11/0766 |
| 2018/0232425 | A1* | 8/2018 | Das | G06F 16/2471 |
| 2018/0285775 | A1* | 10/2018 | Bergen | G06N 20/00 |
| 2020/0193239 | A1* | 6/2020 | Wilson | G06F 16/38 |
| 2021/0125108 | A1* | 4/2021 | Metzler, Jr. | G06F 16/93 |

OTHER PUBLICATIONS

"System and Method for Efficient Search and Retrieval of Log File Records for Hierarchical Data," IBM Corporation, IP.com Prior Art Database Technical Disclosure, No. IPCOM000134924D, Mar. 22, 2006, 6 pg.

Mell, P. et al., "The NIST Definition of Cloud Computing," National Institute of Standards and Technology, U.S. Dept. of Commerce, Special Publication 800-145, Sep. 2011, 7 pg.

\* cited by examiner

REQUEST FLOW LOG RETRIEVAL

BACKGROUND

The present disclosure relates to the field of data processing systems and applications, and more particularly, to providing support for such systems and applications.

A resource-provisioning system can be any system that provides online applications, services, and/or other computing resources to multiple users, typically on demand. The resource-provisioning system can range from a single computer or server such as a webserver to a cloud-based, physical or virtual multimachine computing environment. Cloud-based computing service delivery, for example, can provide on-demand network access to a shared pool of configurable computing resources, typically with minimal management effort or interaction with a provider of the service. A service-oriented architecture of a resource-provisioning system can comprise software components that provide application program interfaces (APIs) accessible to or invokable by other services or software components using a standard protocol or invocation mechanism. Multiple instances of a service can run simultaneously, and each instance can provide the same APIs and functionality based on the same implementation (e.g., code, docker image, deployment artifact). Services can interact by sending requests for invoking operations of one of the APIs provided by a service.

SUMMARY

A method can include extracting, with a computer, at least one keyword from a natural language description of an action, which a user requests that a resource-provisioning system perform during a user session. The method also can include determining a classification of the action based on a correlation value generated by a classifier model trained using machine learning to classify actions performed by the resource-provisioning system based on the at least one keyword. Additionally, the method can include identifying a request flow associated with the action based on the classification of the action and returning at least one system log entry corresponding to the request flow.

A system includes a computer having at least one processor programmed to initiate executable operations. The executable operations can include extracting at least one keyword from a natural language description of an action, which a user requests that a resource-provisioning system performs during a user session. The executable operations also can include determining a classification of the action based on a correlation value generated by a classifier model trained using machine learning to classify actions performed by the resource-provisioning system based on the at least one keyword. Additionally, the executable operations can include identifying a request flow associated with the action based on the classification of the action and returning at least one system log entry corresponding to the request flow.

A computer program product includes a computer-readable storage medium in which is stored program code, the program code executable by computer hardware to initiate operations. The operations can include extracting at least one keyword from a natural language description of an action, which a user requests that a resource-provisioning system performs during a user session. The operations also can include determining a classification of the action based on a correlation value generated by a classifier model trained using machine learning to classify actions performed by the resource-provisioning system based on the at least one keyword. Additionally, the operations can include identifying a request flow associated with the action based on the classification of the action and returning at least one system log entry corresponding to the request flow.

DETAILED DESCRIPTION

Figure 1:
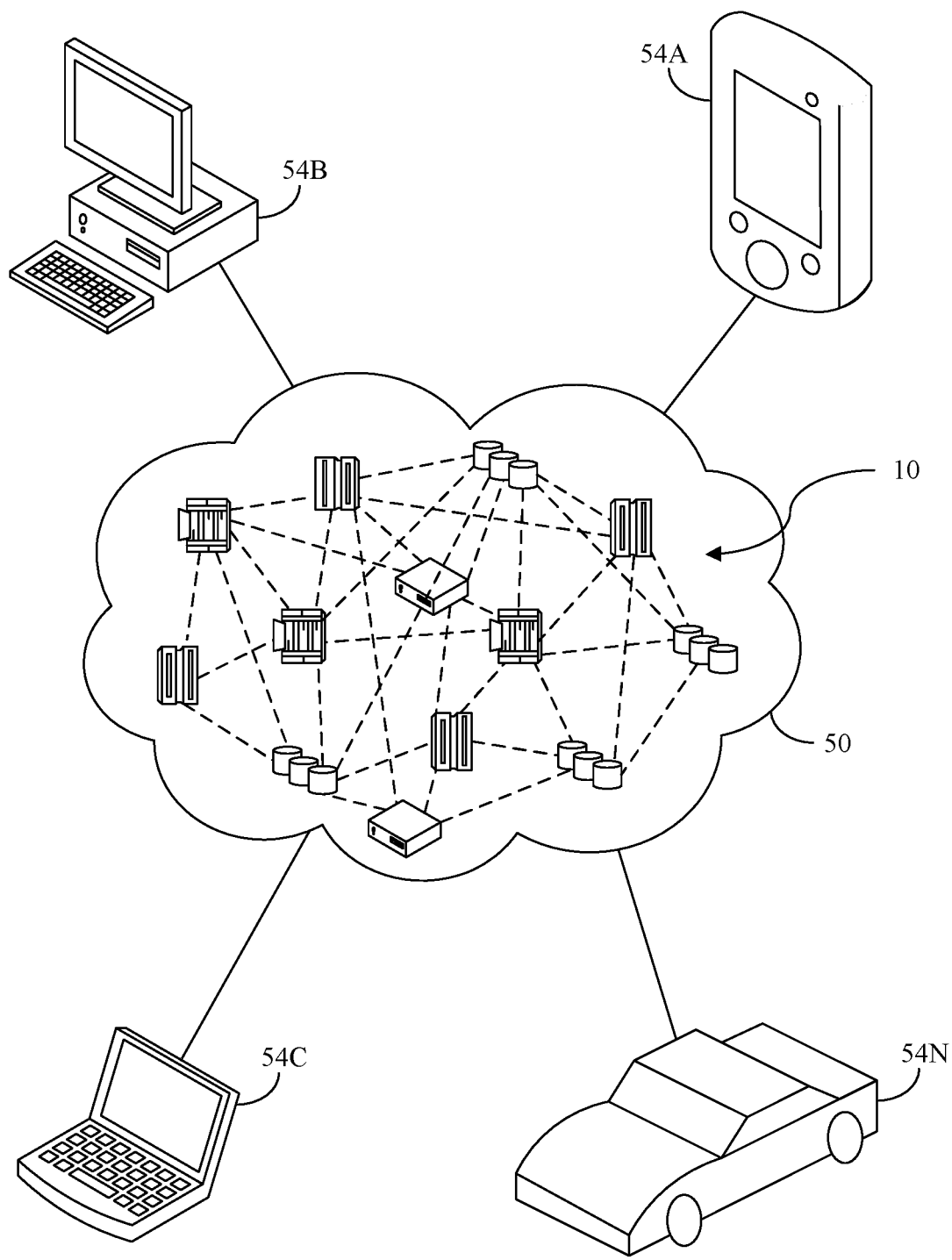
FIG. 1 depicts a cloud computing environment according to an embodiment of the present invention.

A feature of many resource-provisioning systems is user support, often provided to a user remotely via a telephonic and/or computer communications network and involving a support engineer. One scenario involves a user of a resource-provisioning system calling a support hotline and describing to a support engineer a problem that the user is experiencing. The user's description is typically a natural language description such as "I tried to upload an image at 11 AM this morning" or "I was unable to download a document at 4 PM this afternoon." The support engineer usually must know exactly which requests are being processed by the system uploading an image or downloading a document. The support engineer needs to search for those log entries and correlate them to a request flow, which typically comprises the ordered IDs of the requests corresponding to the user's attempted system action. A manual process such as the one described can be quite cumbersome: the engineer initially looking up the user ID of the caller and querying every aspect of the system relating to an image upload or document download service, after which the support engineer needs to identify the request ID and query all log entries for this request ID to see the request flow thru the system. The manual process can necessitate significant training for the support engineer as well as increasing the time needed by the support engineer in helping the user.

The systems, methods, and computer program products disclosed herein facilitate providing support to the users of any type of resource-provisioning system by automatically identifying specific request flows associated with an attempted action based on a natural language description of the action. System-generated log entries corresponding to the request flow so identified can be automatically presented to a support engineer assisting a user of the resource-provisioning system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud-based computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
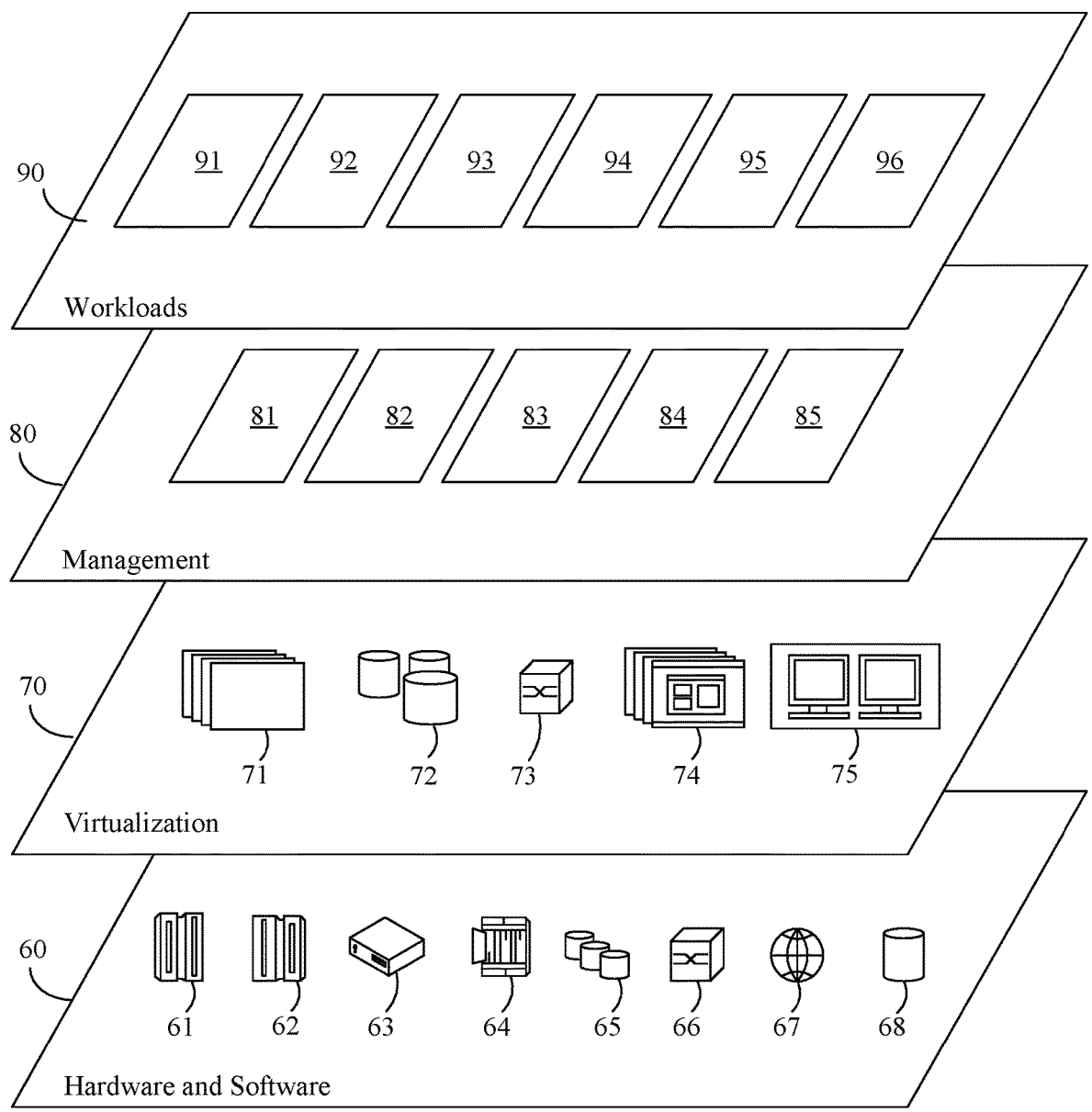
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a request flow log retrieval system 96.

Request flow log retrieval system 96 works in conjunction with or is integrated into a resource-provisioning system, which can be any system that provides online applications, services, and/or other computing resources to multiple users. Operatively, request flow log retrieval system 96 extracts one or more keywords from a natural language description of an action that a user requests the resource-provisioning system perform. Based on the one or more extracted keywords, request flow log retrieval system 96 identifies and returns log entries corresponding to a request flow associated with the action. As defined herein, an "action" is any processing event executed by a processor of a resource-provisioning system. A "request flow" as defined herein is a sequence comprising one or more actions generated by the resource-provisioning system in response to an action request submitted by a user. As also defined herein, a "log" is an electronic record comprising one or more "log entries" documenting aspects of actions performed by the resource-provisioning system.

The natural language description can be a text-based description or a voice rendering reduced to text using known speech recognition techniques. The natural language description can be parsed by request flow log retrieval system 96 using natural language processing (NLP). Request flow log retrieval system 96, in different embodiments, can use any of various NLP techniques for implementing computer processes that facilitate interactions between computer systems and natural (human) languages. NLP generally enables computers to derive computer-understandable meaning from natural language input. The International Organization for Standardization (ISO) publishes standards for NLP, one such standard being ISO/TC37/SC4.

In different embodiments, different information extraction techniques can be used by request flow log retrieval system 96 to extract keywords from the natural language description. Request flow log retrieval system 96 includes a machine learning (ML) model (a model trained using a machine learning algorithm or a statistically based model) that, based on the extracted keywords, identifies one or more request flows and corresponding log entries related to the described action. In one embodiment, the ML model computes a correlation value when presented a feature vector, or an n-tuple, whose elements are the number of times words from a predefined vocabulary appear in the natural language description. The correlation value is used to classify an action based on a natural language description of the action. Based on the classification, request flow log retrieval system 96 identifies a specific request flow associated with the action described and can present to a support engineer the log entries corresponding to the specific request flow. In different embodiments, the request flow log retrieval system 96 can use various machine learning algorithms (e.g., multilayer perceptron, deep neural network learning, or other machine learning algorithm).

In one embodiment, request flow log retrieval system 96 segments the natural language description into separate segments to represent a type of "who-what-and-when" input. The "who" segment can provide an indication of the user seeking support (e.g., system or user ID). The "when" segment can provide an indication of a timeframe in which the user requested that the resource-provisioning system perform the requested action. The timeframe can indicate, for example, a time interval (e.g., hour x, plus-or-minus y minutes). The "what" segment can provide the natural language description from which request flow log retrieval system 96 extracts the keywords used by the machine-learned model to identify a request flow and corresponding log entries. Request flow log retrieval system 96, in one embodiment, uses the segments to generate a search query that the system issues to a search engine for identifying the request flow and corresponding log entries. The ML model, in one embodiment, is trained using machine learning to rank order multiple logs comprising identified log entries. Based on the ranking, request flow log retrieval system 96 can automatically retrieve system-assigned IDs for each user request or present the top-k log entries corresponding to the natural language description to the support engineer.

In one embodiment, request flow log retrieval system 96 can be trained on an on-going basis (e.g., continuously or near-continuously) to associate user actions described in natural language with request flows. The training is done by creating new input to a corpus of training data used to train the ML model. The new data is derived from newly presented requests for assistance by users of the resource-provisioning system and include a natural language description of an action attempted by the user. Initially, the corpus of training data can comprise constructed data, which is constructed solely for training (e.g., using hypothetical natural language descriptions correctly labeled to match actions that the ML model learns to classify.) As request flow log retrieval system 96 responds to actual user-presented natural language descriptions by identifying request flows and corresponding log entries, the system-generated results can be appropriately structured and added to the corpus of training data for refining the ML model through additional machine learning.

The initial machine learning or additionally added training data, according to one embodiment, can begin by electronically capturing a natural language description of a user-requested action and collecting logs corresponding to the user-requested action. The logs can be normalized by removing confidential or user-specific information and used to create an input document that includes keywords extracted from the natural language description. The resulting document can be added to a search index created by a search engine and electronically stored for subsequent searching. The input documents can be used to create correctly labeled sample queries and corresponding sets of sample responses and predefined ranking metric values. The sample queries and responses and the metric values provide training examples to train the request flow log retrieval system model using any of various machine learning algorithms and techniques.

Figure 3:
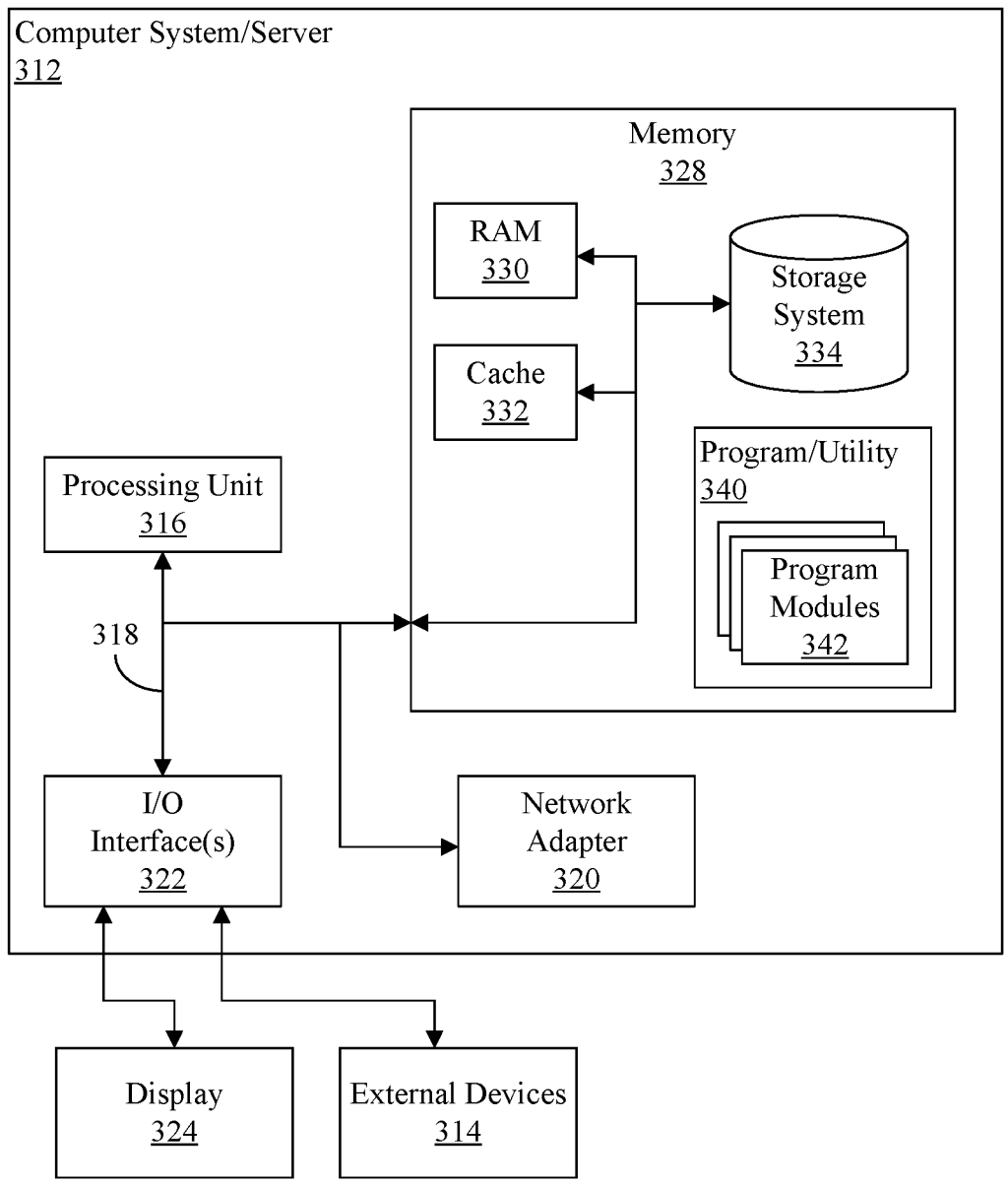
FIG. 3 depicts a cloud computing node according to an embodiment of the present invention.

Referring now to FIG. 3, a schematic of an example of a cloud computing node is shown. Computing node 300 is only one example of a suitable cloud computing node and is not intended to suggest any limitation as to the scope of use or functionality of embodiments described herein. Regardless, computing node 300 is capable of being implemented and/or performing any of the functionality set forth hereinabove.

Computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the described.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may include system for implementing system 96 or portions thereof. Program/utility 340 is executable by processor 316. Program/utility 340 and any data items used, generated, and/or operated upon by computing node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
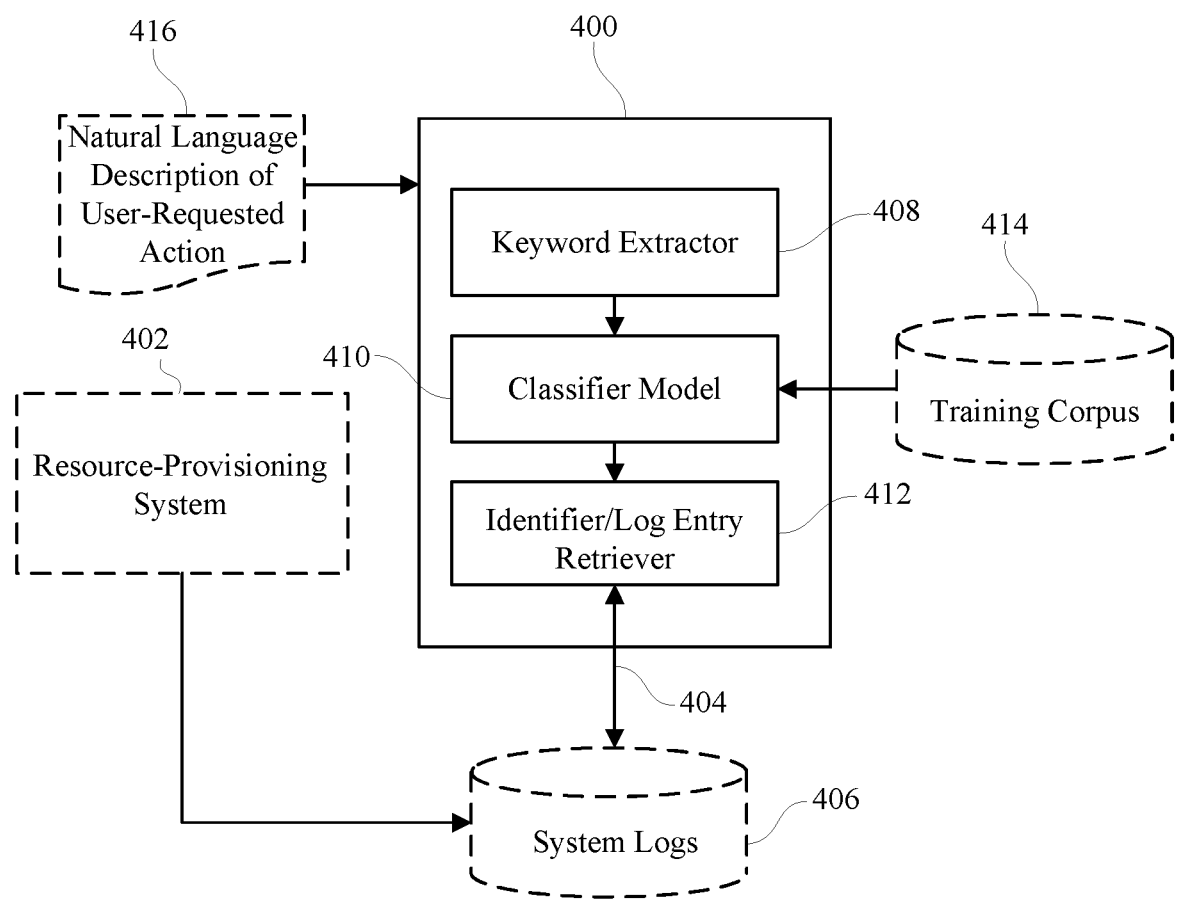
FIG. 4 depicts a request flow log retrieval system according to an embodiment of the present invention.

Referring now to FIG. 4, system 400 illustrates one embodiment of a request flow log retrieval system such as system 96 described with reference to FIG. 2. System 400 works in conjunction with resource-provisioning system 402 by automatically identifying a request flow associated with an action (e.g., upload an image, download a document, or the like) and automatically presenting log entries corresponding to the request flow to a support engineer assisting a resource-provisioning system user. System 400 can be remotely located from the resource-provisioning system 402 (e.g., cloud-based or other server), or alternatively, can be integrated into the service provider system. Illustratively, system 400 is communicatively coupled via data communications channel 404 (e.g., bus, local area network, Internet, or other data communication link) to database 406. Database 406 contains electronically stored system logs corresponding to processing actions performed by resource-provisioning system 402. The logs include log entries corresponding to request flows which, as defined herein, correspond to actions performed or attempted by resource-provisioning system 402 in response to requests submitted by users of the resource-provisioning system.

In one embodiment, system 400 includes a voice receiving/recording component (not expressly shown) coupled with or integrated in a system support hotline system for recording a call received from a user of resource-provisioning system 402 who gives a natural language description of a system-related problem the user is experiencing. In another embodiment, system 400 alternatively or additionally is configured to receive and store a text-based natural language description of the problem the user is experiencing. In still another embodiment, a support engineer can provide the voice or text-based natural language description to the system in real-time while assisting the user or later in response to a previously received help request from the user.

System 400 illustratively includes keyword extractor 408, classifier model 410, and identifier/log entry retriever 412. Keyword extractor 408 utilizes information extraction techniques to extract keywords from a natural language description of a user-requested action and optionally includes a speech recognition capability for converting voice-based natural language descriptions into text from which the keywords are extracted. Classifier model 410 is trained using machine learning, as applied to training corpus 414, to classify user-requested actions performed or attempted by resource-provisioning system 402. For a specific user-requested action, classifier model 410 classifies the action based on the keywords extracted from natural language description 416. Based on the classification, identifier/log entry retriever 412 identifies and retrieves one or more log entries corresponding to a request flow associated with the action. Log entries are retrieved by the system from among multiple log entries stored electronically in database 406. Keyword extractor 408, classifier model 410, and identifier/log entry retriever 412 can each be implemented in computer code executable by a processor such as processor 316 of computer 312 described with reference to FIG. 3. In other embodiments, however, one or more of keyword extractor 408, classifier model 410, and identifier/log entry retriever 412 can be implemented in hardwired circuitry and/or a combination of circuitry and computer code.

Figure 5:
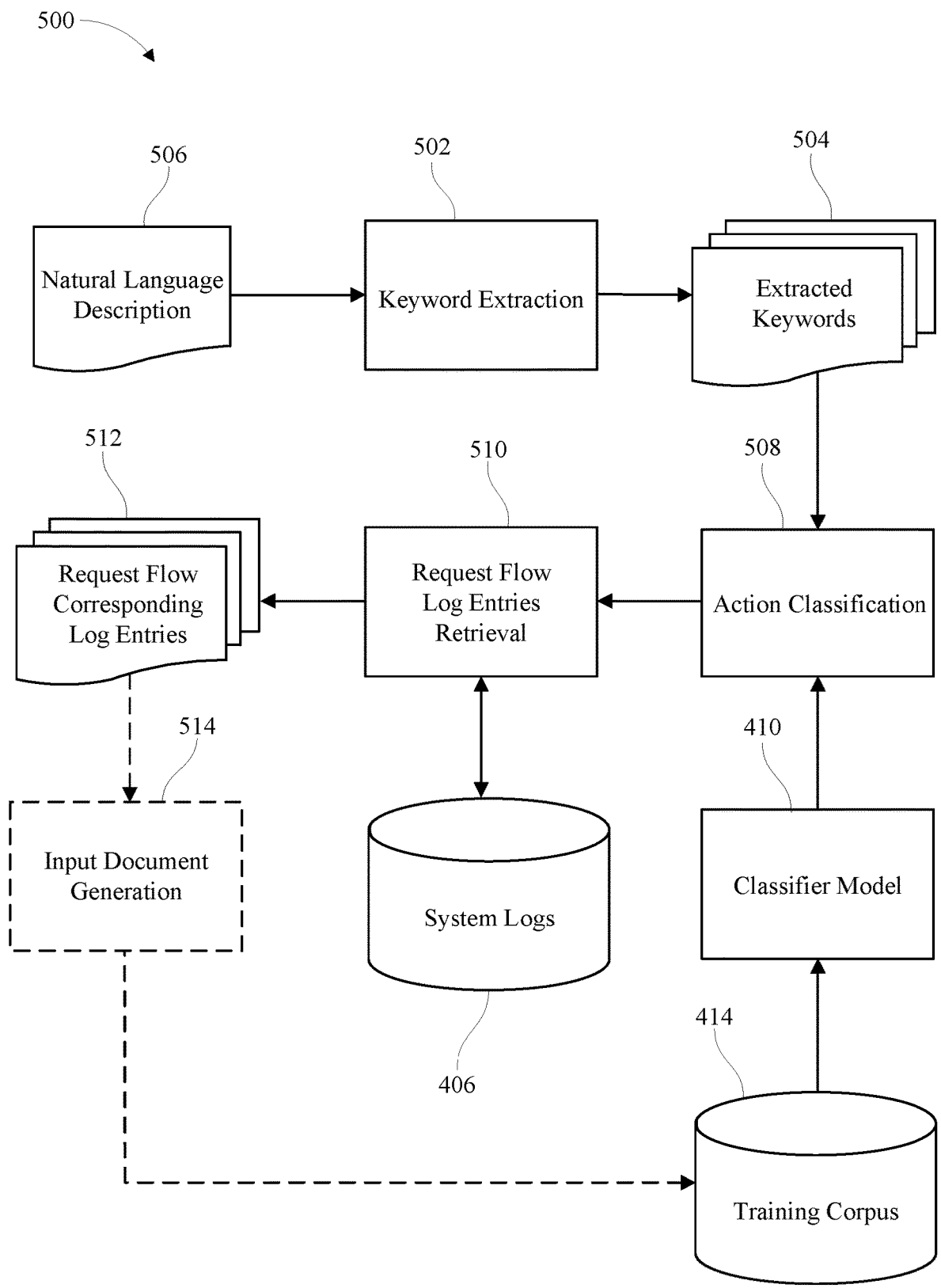
FIG. 5 depicts certain operative features of a request flow log retrieval system according to an embodiment of the present invention.

Referring additionally to FIG. 5, certain operative features 500 of system 400, according to one embodiment, are depicted. At 502, keyword extractor 408 extracts one or more keywords 504 from natural language description 506, which describes a user-requested action submitted to resource-provisioning system 402. Classifier model 410, based on the extracted one or more keywords 504, classifies the user-requested action at 508 with classifier model 410. At 510, based on the classification at 508, identifier/log entry retriever 412 identifies and retrieves one or more log entries 512 corresponding to a request flow associated user-requested action. Log entries 512 were generated by resource-provisioning system 402 in response to a user action request and are electronically stored in and retrieved from database 406. System 400 can automatically present log entries 512 corresponding to the request flow to a support engineer called upon to assist the user of resource-provisioning system 402.

The automatic presentment of the one or more log entries corresponding to the request flow obviates the support engineer having to manually identify an action request (typically based on a request ID) and manually query all corresponding log entries in order to view the request flow. In one embodiment, described more fully below, the classifier model is trained using machine learning to rank order multiple logs comprising log entries corresponding to a request flow.

Optionally, as also described below, keywords extracted from natural language description 506 can be coupled with the resulting log entries and corresponding request flow to generate at 514 an input document. The input document can be used to create additional training data that is added to training corpus 414 for refining the classifier model 410. Classifier model 410 can be refined on an on-going basis with each new addition of training data that is added to training corpus 414. Accordingly, system 400 can automatically self-improve as the system is used to automatically identify, retrieve, and optionally rank log entries and corresponding request flows based on received natural language descriptions of user-requested actions.

A classifier model can be trained, initially, using a corpus of constructed training data. Training data can be constructed through a multi-step procedure that begins with the generation of a set of request flows that are generated by executing actions on a resource-provisioning system, the actions initiated by hypothetical user requests (e.g., upload an image, download a document, or the like). System-generated logs corresponding to each request flow initiated by such a request are collected and example input documents are created from the logs for each corresponding request flow. The example input documents are used to train the classifier model.

Keywords can be extracted from the natural language descriptions using any of various known information extraction techniques. For example, according to one embodiment, an importance vector can be generated for each description based on statistically determined importance values of the words in each description. A classification tree can be formed by clustering the descriptions based on the importance vectors and a hierarchical structure built by generalizing the classification tree. Clusters can be determined by dividing the generalized structure into separate parts and extracting statistically significant keywords from similar descriptions. In different embodiments, various other known information extraction techniques can be used for extracting keywords. Optionally, synonyms and/or tags can also be added to a set of extracted keywords to create additional keywords.

Extracted keywords are added to the input documents. A document identifier (e.g., document identification or ID) can be assigned to each such document and each such document indexed. In one embodiment, input document indices can comprise a search index created by and used with any known search engine for searching a database containing indexed log entries. The training data is constructed by matching labeled sample queries and sample response IDs corresponding to the document IDs created to train the classifier model using any of various known machine learning techniques.

A classifier model can be trained with a classification learning algorithm that, based on a collection of labeled examples as inputs, generates a model that can take an unlabeled example as input and output a label or number from which a label (or classification) can be deduced. For example, in one embodiment, the classifier model is a multilayer perceptron generated through supervised learning using the backpropagation algorithm. Each example can be configured as an n-tuple, or feature vector, in which each element corresponds to the number of times that a keyword from a predetermined vocabulary appears in a natural language description of an action. The classifier model can comprise a function $f: \mathbb{R}^n \to \{1, \ldots, k\}$ that, using a weight vector w, maps an input feature vector x to one of k categories by computing a value (e.g., correlation value) y, where $y = f(x) = w \cdot x = w^T x$. The weight vector can initially be assigned random values that are then iteratively adjusted using machine learning until the labeled test data is classified with an acceptable level of accuracy. The model correctly classifies the natural language description if the inner product of the weight vector and corresponding feature vector, w·x, yields a correlation value y that maps the description to the appropriate action.

For example, in another embodiment, the classifier can be trained to provide a single value that determines the similarity between two feature vectors. This can be used to determine a similarity value for a first feature vector, representing a current user action, with a second feature vector, representing one possible action from a class of historical actions. The similarity value can be used to give an indication if the current user action belongs to the same class of actions that the second feature vector is taken from.

For example, in yet another embodiment, the classifier can be constructed from a Restricted Boltzmann Machine (RBM). A machine learning algorithm can then be used to train the RBM neural network using historical data. As an advantage over multilayer perceptions, an RBM can be trained by an unsupervised machine learning algorithm. With sufficient training, the RBM will become able to differentiate between multiple sets of user actions represented by, clusters of feature vectors in the hidden nodes. The RBM can then be used to predict from a feature vector representing a current user action one or more other related actions that belong to related classes of user actions.

The model, in one embodiment, is trained using machine learning to rank order user-initiated request flows and corresponding log entities. The rank order is based on a predetermined ranking metric, $\lambda$. One such metric can measure the "closeness" of a natural language description to a specific user-requested action. For example, $\lambda$ can be computed as the squared norm of a vector z, $\lambda = \|z\|^2$, each element of which is one if a keyword associated with an action is present in the natural language description and zero otherwise. Different predetermined metrics can be used in various other embodiments. Based on the value of the ranking metric, the request flow log retrieval system returns the corresponding log entries in a rank order determined by the ranking model. This is but one example and various other ranking metrics can be applied in other embodiments. Based on any such metric, the log entries corresponding to the natural language description of a user-requested action are identified in a ranking order determined by the system. Thus, the system can automatically retrieve request IDs from among the top-k log entries or simply present the top-ranked results to the support engineer.

Figure 6:
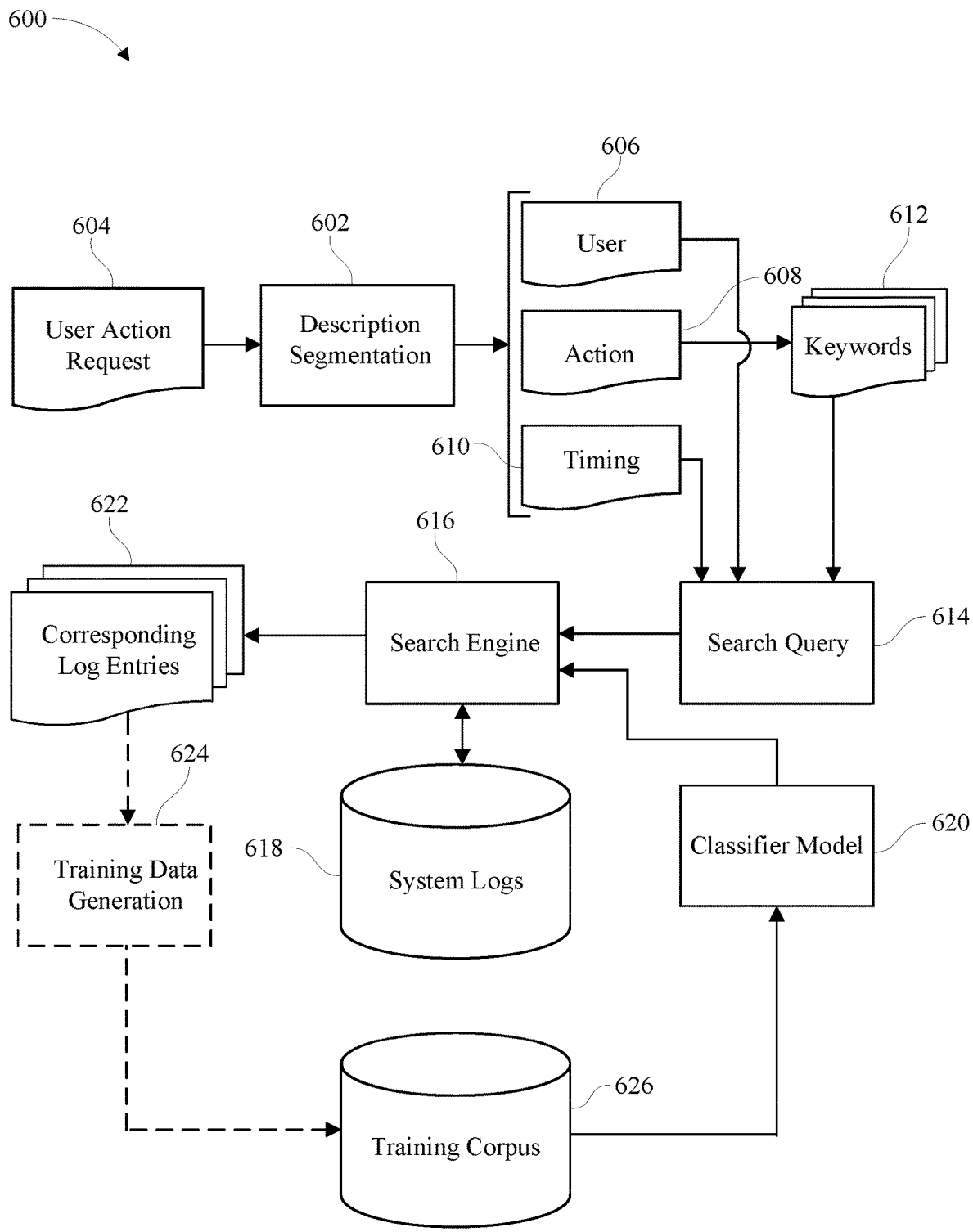
FIG. 6 depicts certain operative features of a request flow log retrieval system according to another embodiment of the present invention.

FIG. 6 depicts certain operative features 600 of a log retrieval system, according to another embodiment. The system at 602 initially segments a user action request 604 containing a natural language description of a system action into distinct segments. Illustratively, the segments include user segment 606, action segment 608, and timing segment 610. The system extracts one or more keywords 612 pertaining to a system action from the action segment, which includes the natural language description. The system creates a search query at 614 based on the user segment, timing segment, and extracted keywords. The search query is submitted to search engine 616, which searches indexed items electronically stored in database 618. Based on the search query, the system classifies the action based on a correlation value generated by classification model 620 trained using machine learning. Search engine 616 returns one or more log entries 622 corresponding to request flows generated in response to the user action request. The system can rank multiple logs comprising identified log entries on the basis of a ranking model. The system can automatically retrieve indexed user request IDs (generated by a resource-provisioning system) from the top-ranked search result, or simply present the top-ranked search results to a support engineer.

Optionally, the system at 624 can use the results to generate additional training data that can be added to training corpus 626 to further refine classifier model 620 using machine learning. The system initially collects and normalizes logs of identified request flows. The system normalizes a log by removing confidential and/or user-specific indicators (e.g., user IDs), as well as data particular to a specific user request not otherwise commonly associated with a specific action. The system uses the normalized logs to create an input document that is added to a search index using an ID created by the search engine. The input documents can be used to create training data comprising a labeled search query, a set of sample response IDs created from electronically stored and indexed input document IDs, and a set of ranking metric values. Newly generated training data can be added to a corpus of training data that includes constructed training data used initially to train the classifier model using machine learning.

Figure 7:
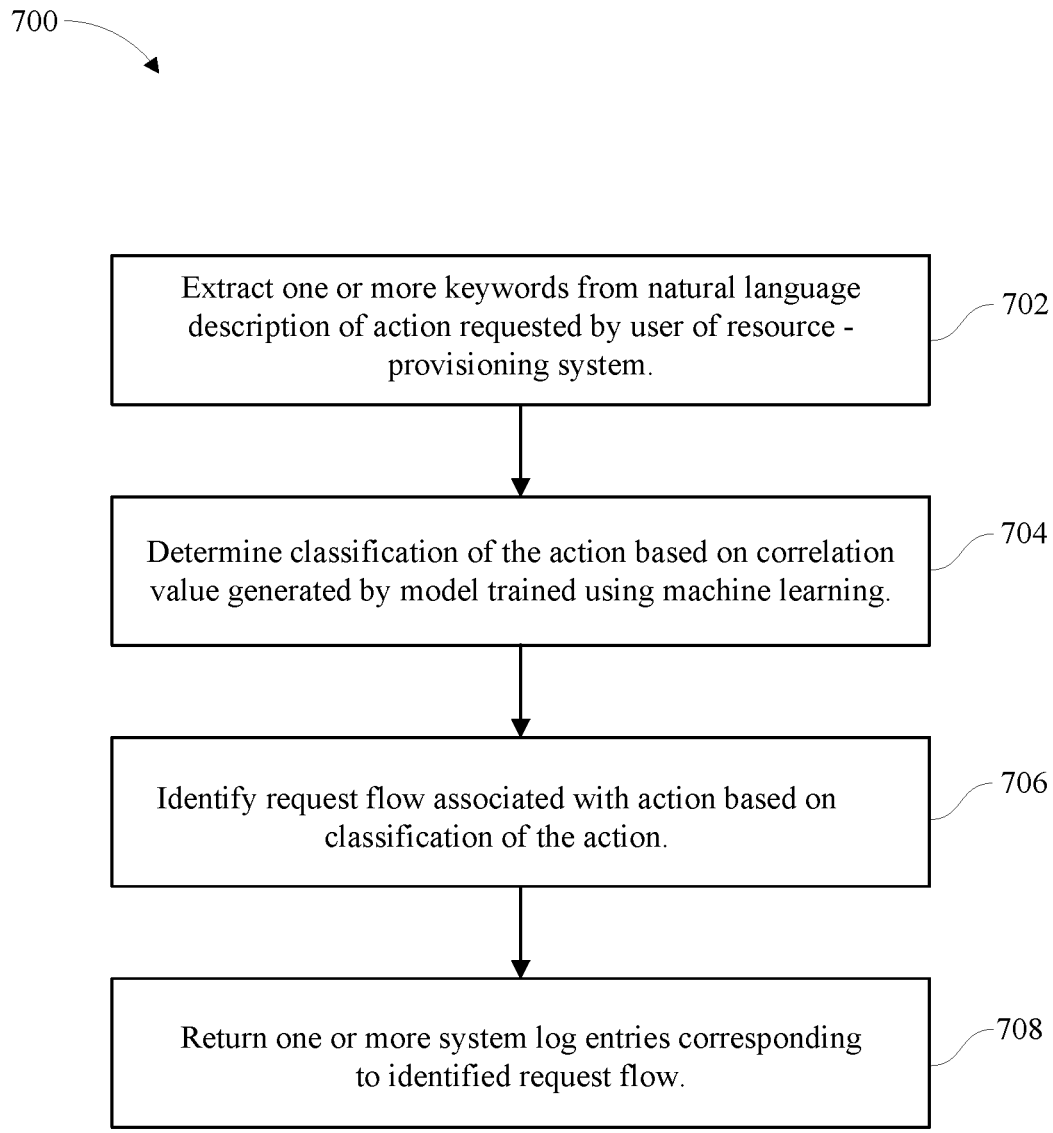
FIG. 7 is a flowchart of a method of request flow log retrieval according to one embodiment of the present invention.

FIG. 7 is a flowchart of method 700 of request flow log retrieval according to one embodiment. Method 700 can be performed by a request flow log retrieval system the same as or similar to the systems described in reference to FIGS. 1-6. The method can begin with the system, working in conjunction with a resource-provisioning system, receiving a natural language description of an action that a user requests the resource-provisioning system to perform during a user session. At 702, the request flow log retrieval system extracts one or more keywords from the natural language description of the action requested by the user. Based on a correlation value generated by a classifier model, the request flow log retrieval system determines a classification of the action at 704. The request flow log retrieval system at 706 identifies a request flow associated with the action, the identification based on the classification of the action. At 708, the request flow log retrieval system returns one or more system log entries corresponding to the identified request flow. Optionally, if multiple logs comprise identified log entries, the request flow log retrieval system can rank order the logs and either automatically retrieve request IDs from the top ranked results, or simply present the top ranked results to a support engineer.

Figure 8:
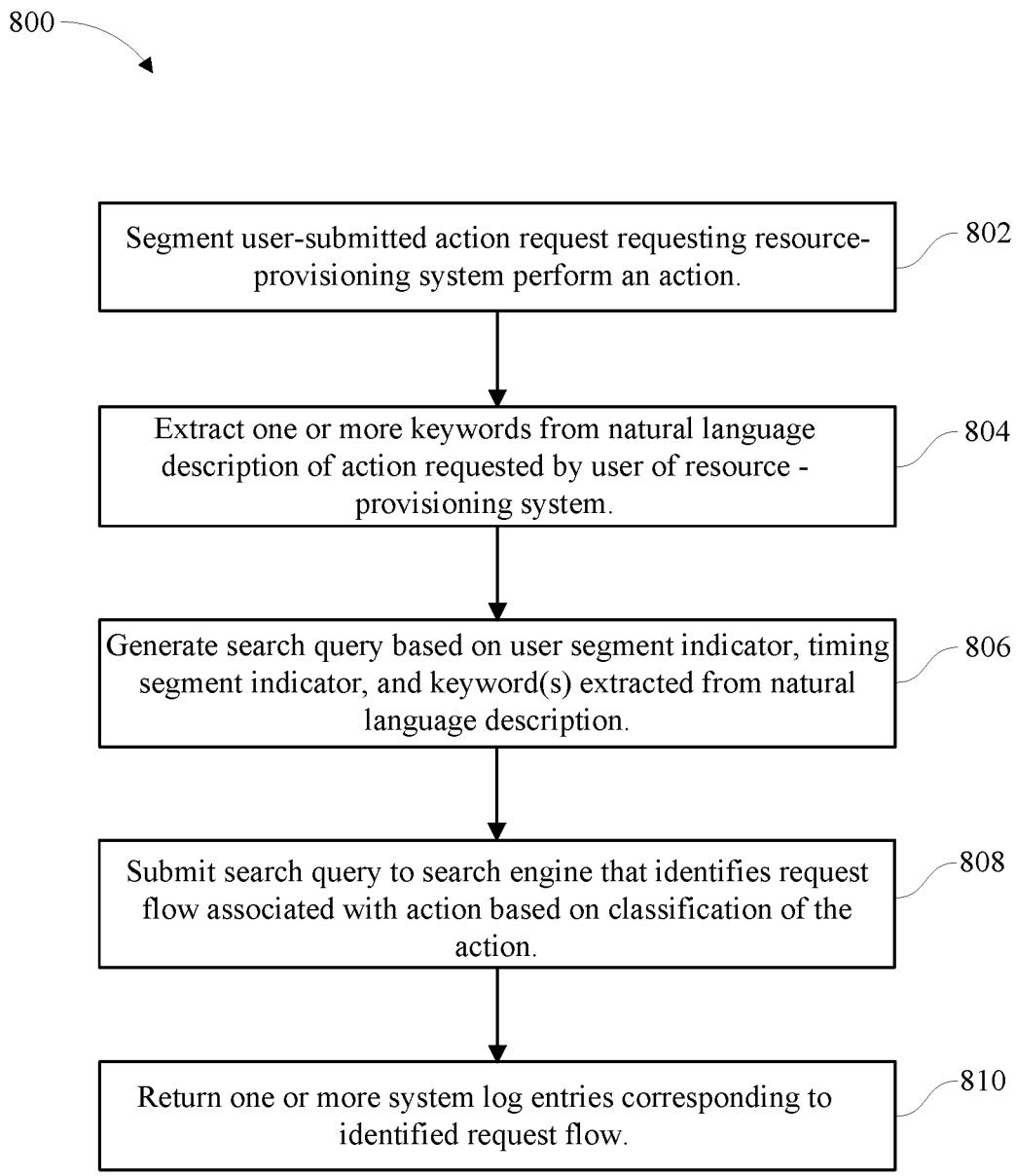
FIG. 8 is a flowchart of a method of request flow log retrieval according to another embodiment of the present invention.

Referring now to FIG. 8, a flowchart of method 800 of request flow log retrieval according to another embodiment is shown. Method 800 also can be performed by a request flow log retrieval system the same as or similar to the systems described in reference to FIGS. 1-6. The request flow log retrieval system can work in conjunction with a resource-provisioning system that performs user-requested actions in response to action requests. At 802, the request flow log retrieval system can segment a user-submitted action request. The action request can be segmented into at least a user segment, a timing segment, and an action. The user segment can provide a user or session indicator (e.g., user ID, session ID, or the like) that indicates who the user is that submitted the action request and/or the session in which the action request was submitted. The action segment can include a natural language description of the requested action (received as text or converted to text from a recorded voice message using speech recognition). The timing segment can provide a timing indicator that indicates a timeframe (e.g., 11:45 AM plus-or-minus 5 minutes) during which the resource-provisioning system performed or attempted to perform the requested action.

Figure 9:
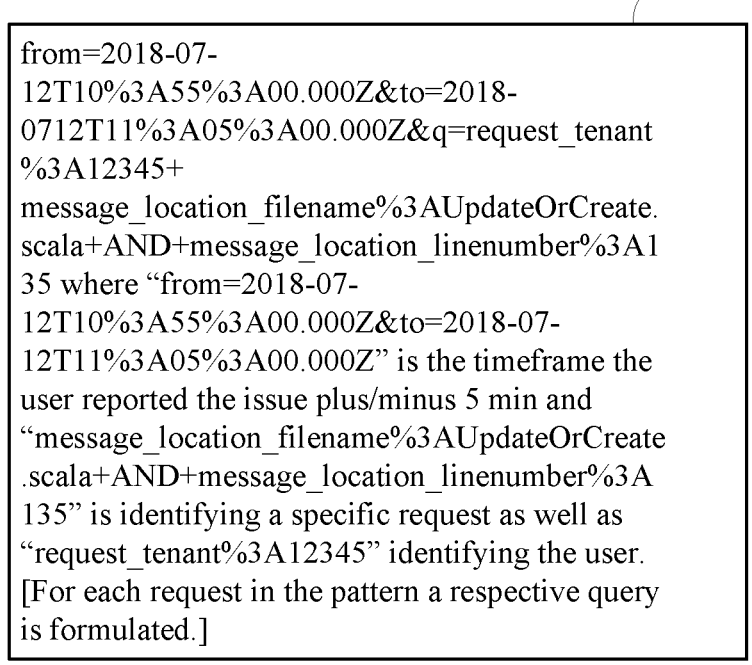
FIG. 9 is an example search query generated by a request flow log retrieval system according to one embodiment of the present invention.

At 804, the request flow log retrieval system extracts one or more keywords from the natural language description of the action requested by the user. With the one or more extracted keywords, the request flow log retrieval system generates input values (e.g., n-tuple elements of a feature vector) used by a classifier to identify a request flow associated with the action based on a classification of the action. The request flow log retrieval system at 806 generates a search query based on the user or session indicator, the timing indicator, and the one or more extracted keywords. Referring additionally to FIG. 9, an example search query 900 is shown.

Referring still to FIG. 8, the search query is submitted to a search engine of the request flow log retrieval system at 808. At 810, the request flow log retrieval system returns one or more system log entries corresponding to the identified request flow. Optionally, if more than one log contains identified log entries and are returned, the logs can be rank ordered by the request flow log retrieval system based on a ranking model trained using machine learning. The request flow log retrieval system can automatically retrieve request IDs from the top-ranked search results, or simply present the top-ranked search results to a support engineer.

Figure 10:
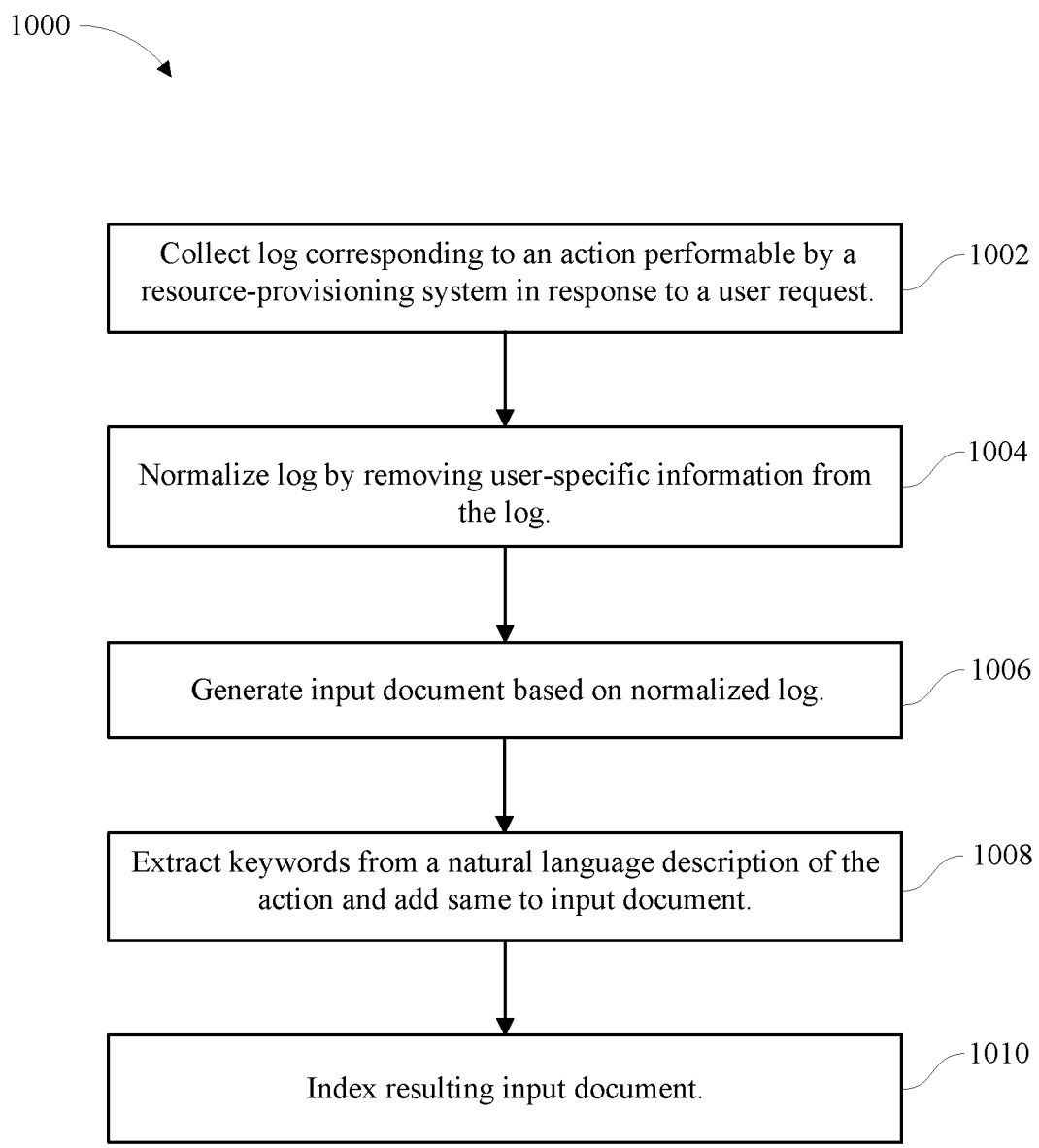
FIG. 10 is a flowchart of a method of generating training data for training a classifier model for classifying user-requested actions to be performed by a resource-provisioning system according to one embodiment of the present invention.

Referring now to FIG. 10, a method 1000 of generating training data for training a classifier model of a request flow log retrieval system according to one embodiment. Method 1000 can be performed with a request flow log retrieval system the same as or similar to the systems described in reference to FIGS. 1-6. The method can be performed to generate constructed data using hypothetical action requests and corresponding request flows generated by a resource-provisioning system. Subsequently, data can be generated using the same procedures applied with respect to user-initiated action requests in which the user encounters a problem and requests assistance from a support engineer.

At 1002, the system collects a log generated by a resource-provisioning system and corresponding to an action performable by the resource-provisioning system. The log is normalized at 1004. Normalizing entails sampling the log and removing user-specific data (e.g., confidential information, user-specific names and/or identifications, and other user-specific data), leaving only data commonly generated by the system in performing the action (e.g., entry and exit log entries and other action-related log entries at a given level). A normalized log thus retains that data which is common across different users who request the same action. An input document, at 1006, is generated from the normalized log. Keywords are extracted from a natural language description of the action and added to the input document at 1008. At 1010, the resulting input document is indexed before being added to a database. In various embodiments, an input document can be added additionally or alternatively to a search engine, a file system, as well as a databased comprising a corpus of training data.

The input documents created with method 1000 are used to create correctly labeled sample queries and corresponding sets of sample responses and predefined ranking metric values. The sample queries and responses and the metric values are input as training examples to train a request flow log retrieval system model using any of various machine learning algorithms and techniques.

Each of the described methods can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-10 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:
1. A method, comprising:
extracting, with a computer, at least one keyword from a natural language description of an action which a user requests that a resource-provisioning system perform during a user session;
segmenting a user request requesting the action into a plurality of segments that include:
a user segment that provides a user indicator;
a timing segment that identifies a timeframe during which performing the action the user requested was attempted; and an action segment from which the at least one keyword is extracted;

training a classifier model to classify actions performed by the resource provisioning system using training data comprising a labeled search query as an input, wherein the classifier model is a multilayer perceptron or a neural network;

determining a classification of the action based on a correlation value generated by the classifier model based on the at least one keyword;

identifying a request flow associated with the action based on the classification of the action;

rank ordering a plurality of system log entries identified as corresponding to the request flow by applying a ranking model trained using machine learning to each of the plurality of system log entries, the user indicator, a timing indicator provided by the timing segment, and the at least one keyword; and returning the rank ordered plurality of system log entries.

2. The method of claim 1, wherein the classifier model comprises a multilayer perceptron.

3. The method of claim 1, further comprising generating a corpus of training data for training the classifier model.

4. The method of claim 3, wherein the generating a corpus of training data comprises:

creating an input document comprising a user request and system log entries corresponding to a request flow associated with the user request;

adding to the input document at least one keyword extracted from a natural language description of the user request;

indexing the input document; and electronically storing the input document in at least one of a search engine, file system, and database comprising the corpus of training data.

5. The method of claim 3, further comprising adding data to the corpus of training data to refine the classifier model, wherein the adding comprises:

electronically recording a natural language description of a user request;

collecting and normalizing at least one log comprising system log entries corresponding to the user request;

creating an input document from the at least one log by adding to the at least one log at least one keyword extracted from the user request; and adding the input document to a database comprising the corpus of training data.

6. A system, comprising:

a computer having at least one processor programmed to initiate executable operations, the executable operations comprising:

extracting at least one keyword from a natural language description of an action which a user requests that a resource-provisioning system perform during a user session;

segmenting a user request requesting the action into a plurality of segments that include:

a user segment that provides a user indicator;

a timing segment that identifies a timeframe during which performing the action the user requested was attempted; and an action segment from which the at least one keyword is extracted;

training a classifier model to classify actions performed by the resource provisioning system using training data comprising a labeled search query as an input, wherein the classifier model is a multilayer perceptron or a neural network;

determining a classification of the action based on a correlation value generated by the classifier model based on the at least one keyword;

identifying a request flow associated with the action based on the classification of the action;

rank ordering a plurality of system log entries identified as corresponding to the request flow by applying a ranking model trained using machine learning to each of the plurality of system log entries, the user indicator, a timing indicator provided by the timing segment, and the at least one keyword; and returning the rank ordered plurality of system log entries.

7. The system of claim 6, wherein the classifier model comprises a multilayer perceptron.

8. The system of claim 6, wherein the executable operations further include generating training data that is added to a corpus of training data for training the classifier model.

9. The system of claim 8, wherein the generating training data comprises:

electronically recording a natural language description of a new user request;

collecting and normalizing at least one log corresponding to the new user request;

adding to the at least one log at least one keyword extracted from the new user request;

creating a new input document comprising the at least one log and the at least one keyword extracted from the new user request; and adding the new input document to the corpus of training data.

10. A computer program product, comprising:

a computer-readable storage medium having program code stored thereon, the program code executable by computer hardware to initiate operations including:

extracting at least one keyword from a natural language description of an action which a user requests that a resource-provisioning system perform during a user session;

segmenting a user request requesting the action into a plurality of segments that include:

a user segment that provides a user indicator;

a timing segment that identifies a timeframe during which performing the action the user requested was attempted; and an action segment from which the at least one keyword is extracted;

training a classifier model to classify actions performed by the resource provisioning system using training data comprising a labeled search query as an input, wherein the classifier model is a multilayer perceptron or a neural network;

determining a classification of the action based on a correlation value generated by the classifier model based on the at least one keyword;

identifying a request flow associated with the action based on the classification of the action;

rank ordering a plurality of system log entries identified as corresponding to the request flow by applying a ranking model trained using machine learning to each of the plurality of system log entries, the user indicator, a timing indicator provided by the timing segment, and the at least one keyword; and returning the rank ordered plurality of system log entries.

11. The computer program product of claim 10, wherein the classifier model comprises a multilayer perceptron.

12. The computer program product of claim 10, wherein the operations further include generating a corpus of training data for training the classifier model.

13. The computer program product of claim 12, wherein the generating a corpus of training data comprises:
- creating an input document comprising a user request and system log entries corresponding to a request flow associated with the user request;
- adding to the input document at least one keyword extracted from a natural language description of the user request;
- indexing the input document; and
- electronically storing the input document in at least one of a search engine, file system, and database comprising the corpus of training data.

14. The computer program product of claim 12, wherein the operations further include adding data to the corpus of training data to refine the classifier model, wherein the adding comprises:
- electronically recording a natural language description of a user request;
- collecting and normalizing at least one log comprising system log entries corresponding to the user request;
- creating an input document from the at least one log by adding to the at least one log at least one keyword extracted from the user request; and
- adding the input document to a database comprising the corpus of training data.

\* \* \* \* \*